(12) United States Patent
Dong et al.

(10) Patent No.: US 11,905,994 B2
(45) Date of Patent: Feb. 20, 2024

(54) MAGNETIC BEARING, COMPRESSOR AND AIR CONDITIONER

(71) Applicant: Gree Electric Appliances, Inc. of Zhuhai, Guangdong (CN)

(72) Inventors: Mingzhu Dong, Guangdong (CN); Yusheng Hu, Guangdong (CN); Bin Chen, Guangdong (CN); Xiaobo Zhang, Guangdong (CN); Fang Zhang, Guangdong (CN); Gao Gong, Guangdong (CN); Chao Zhang, Guangdong (CN); Mingxing Deng, Guangdong (CN)

(73) Assignee: Gree Electric Appliances, Inc. of Zhuhai, Guangdong (CN)

( * ) Notice: Subject to any disclaimer, the term of this patent is extended or adjusted under 35 U.S.C. 154(b) by 0 days.

(21) Appl. No.: 17/765,329

(22) PCT Filed: Aug. 24, 2020

(86) PCT No.: PCT/CN2020/110800
§ 371 (c)(1),
(2) Date: Mar. 30, 2022

(87) PCT Pub. No.: WO2021/135276
PCT Pub. Date: Jul. 8, 2021

(65) Prior Publication Data
US 2022/0333644 A1 Oct. 20, 2022

(30) Foreign Application Priority Data
Dec. 31, 2019 (CN) .......................... 201911411355.9

(51) Int. Cl.
*F16C 32/04* (2006.01)
*F25B 31/02* (2006.01)

(52) U.S. Cl.
CPC ...... *F16C 32/0474* (2013.01); *F16C 2360/00* (2013.01); *F25B 31/026* (2013.01)

(58) Field of Classification Search
CPC .............. F16C 32/0474; F16C 2360/00; F16C 2362/52; F16C 32/0463; F16C 32/0465;
(Continued)

(56) References Cited

U.S. PATENT DOCUMENTS

2003/0141774 A1* 7/2003 Komura ............... H02K 1/2733
310/156.43

FOREIGN PATENT DOCUMENTS

CN 101220832 A * 7/2008 .......... F16C 32/0465
CN 102900761 A 1/2013
(Continued)

*Primary Examiner* — Tulsidas C Patel
*Assistant Examiner* — Joshua Kiel M Rodriguez
(74) *Attorney, Agent, or Firm* — The Webb Law Firm

(57) ABSTRACT

Disclosed are a magnetic bearing, a compressor and an air conditioner. The magnetic bearing includes a radial stator, wherein the radial stator has a plurality of stator teeth extending inwardly in a radial direction thereof; two axial stators are arranged on two axial sides of the stator teeth, respectively; and radial control coils are wound on the stator teeth, each radial control coil being located outside an area of the stator teeth covered oppositely by the two axial stators. The magnetic bearing, the compressor and the air conditioner can effectively reduce the degree of coupling between a radial electromagnetic control magnetic circuit and an axial electromagnetic control magnetic circuit, and reduce the control difficulty of the magnetic bearing.

9 Claims, 4 Drawing Sheets

(58) Field of Classification Search
CPC .. F16C 32/0468; F16C 32/044; F25B 31/026;
F25B 1/00; F04B 39/00
See application file for complete search history.

(56) References Cited

FOREIGN PATENT DOCUMENTS

| | | | | |
|---|---|---|---|---|
| CN | 202883726 U | 4/2013 | | |
| CN | 103490572 A | 1/2014 | | |
| CN | 103441630 B | 12/2015 | | |
| CN | 105610288 A | 5/2016 | | |
| CN | 105864292 A | 8/2016 | | |
| CN | 106050918 A | 10/2016 | | |
| CN | 107579637 A | 1/2018 | | |
| CN | 108547868 A | * 9/2018 | .......... | F16C 32/0442 |
| CN | 111102291 A | 5/2020 | | |
| CN | 211550276 U | 9/2020 | | |
| JP | 2013127274 A | 6/2013 | | |

* cited by examiner

MAGNETIC BEARING, COMPRESSOR AND AIR CONDITIONER

CROSS-REFERENCE TO RELATED APPLICATIONS

This application is the United States national phase of International Application No. PCT/CN2020/110800 filed Aug. 24, 2020, and claims priority to Chinese patent application No. 201911411355.9, filed on Dec. 31, 2019, the disclosures of which are hereby incorporated by reference in their entirety.

BACKGROUND OF THE DISCLOSURE

The present disclosure relates to the technical field of magnetic bearing manufacturing, and in particular, to a magnetic bearing, a compressor, and an air conditioner.

DESCRIPTION OF RELATED ART

A magnetic bearing is a bearing that uses an electromagnetic force to achieve stable levitated operation of a rotor system without mechanical contact. Compared with a traditional mechanical bearing, the magnetic bearing has excellent characteristics such as no friction, no abrasion, no need for seal lubrication, a high speed, high precision, a long life and a low maintenance cost, and has broad application prospects in high-speed transmission fields such as high-speed motors, high-speed motorized spindles and high-speed flywheel energy storage systems.

According to different excitation modes, magnetic bearings may be classified into active magnetic bearings, passive magnetic bearings and hybrid magnetic bearings (also called permanent magnet biased magnetic bearings). A hybrid magnetic bearing uses a magnetic field generated by a permanent magnet as a static bias magnetic field, which not only reduces coil turns of an electromagnet and greatly reduces the power consumption of a power amplifier, but also achieves a smaller volume of the magnetic bearing and a lower weight, so the hybrid magnetic bearing has become a hot research topic. In general, axial and radial levitation control is integrated to form a three-degree-of-freedom magnetic bearing, which has the advantages of high integration, a small volume and a low weight, but such a magnetic bearing is prone to coupling between radial and axial magnetic circuits, which greatly increases the control difficulty of the magnetic bearing.

SUMMARY OF THE DISCLOSURE

Therefore, a technical problem to be solved by the present disclosure is providing a magnetic bearing, a compressor and an air conditioner, which can effectively reduce the degree of coupling between a radial electromagnetic control magnetic circuit and an axial electromagnetic control magnetic circuit, and reduce the control difficulty of the magnetic bearing.

To solve the above problem, the present disclosure provides a magnetic bearing, which includes a radial stator, wherein the radial stator has a plurality of stator teeth extending inwardly in a radial direction thereof; two axial stators are arranged on two axial sides of the stator teeth, respectively; and radial control coils are wound on the stator teeth, the radial control coils being located outside an area of the stator teeth covered oppositely by the two axial stators.

In an embodiment, the plurality of stator teeth is uniformly spaced circumferentially of the radial stator, and the number of the stator teeth is 2N, where N≥2.

In an embodiment, the axial stators are provided with a first annular groove on a side facing the stator teeth, and an axial control coil is arranged in the first annular groove.

In an embodiment, current directions of the axial control coils on the two axial sides of the stator teeth are same.

In an embodiment, the first annular groove has a first groove wall close to an axis of the axial stator, the first groove wall having a diameter D, and when the magnetic bearing is assembled with a rotating shaft, a rotor of the rotating shaft has an outer diameter d, where d≥D.

In an embodiment, the axial stator is further provided with a second annular groove on the side facing the stator teeth, and a permanent magnet is arranged in the second annular groove.

In an embodiment, the second annular groove has an outer diameter H, where H<D.

In an embodiment, the permanent magnet is an annular permanent magnet, and/or the permanent magnet is in interference fit with the second annular groove.

The present disclosure further provides a compressor, which includes the above-mentioned magnetic bearing.

The present disclosure further provides an air conditioner, which includes the above-mentioned compressor.

In the magnetic bearing, the compressor and the air conditioner provided in the present disclosure, arranging the radial control coils outside the area of the stator teeth covered oppositely by the two axial stators allows, in terms of physical structure, corresponding radial electromagnetic control magnetic circuits generated by the radial control coils not to pass through the axial stators, thereby effectively reducing the degree of coupling between radial electromagnetic control magnetic circuits on the axial stators and an axial electromagnetic control magnetic circuit, thus reducing the control difficulty of the magnetic bearing.

REFERENCE SIGNS

Figure 1:
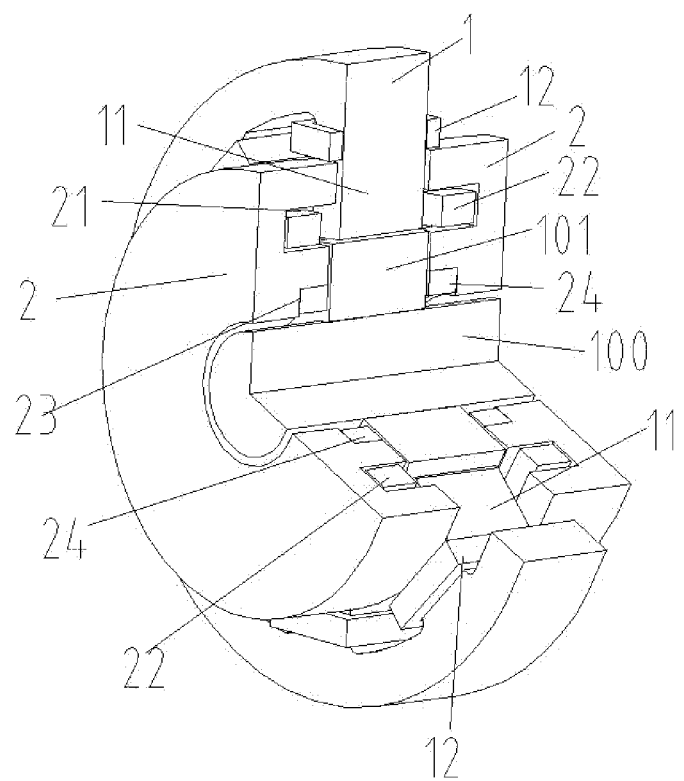
FIG. 1 is an internal structure diagram of a magnetic bearing in an embodiment of the present disclosure (including illustration of assembly with a rotating shaft)

1—radial stator; 11—stator tooth; 12—radial control coil; 2—axial stator; 21—first annular groove; 22—axial control coil; 23—second annular groove; 24—permanent magnet; 100—rotating shaft; 101—rotor; 200—radial electromagnetic control magnetic circuit; 301—axial electromagnetic control magnetic circuit; 302—axial permanent magnet control magnetic circuit.

DETAILED DESCRIPTION

Referring to FIGS. 1 to 4, according to an embodiment of the present disclosure, there is provided a magnetic bearing, in particular a three-degree-of-freedom magnetic bearing, which includes a housing (not shown in the figures) with a radial stator 1 arranged therein. The radial stator 1 has a plurality of stator teeth 11 extending inwardly in a radial direction thereof. Two axial stators 2 are arranged on two axial sides of the stator teeth 11, respectively. Radial control coils 12 are wound on the stator teeth 11. The radial control coils 12 are located outside an area of the stator teeth 11 covered oppositely by the two axial stators 2, i.e., an outer diameter of the axial stators 2 is smaller than an inner diameter of a ring formed the radial control coils 12. In this technical solution, arranging the radial control coils 12 outside the area of the stator teeth 11 covered oppositely by the two axial stators 2 allows, in terms of physical structure, corresponding radial electromagnetic control magnetic circuits 200 generated by the radial control coils 12 not to pass through the axial stators 2, thereby effectively reducing the degree of coupling between the radial electromagnetic control magnetic circuits 200 on the axial stators 2 and an axial electromagnetic control magnetic circuit 301, thus reducing the control difficulty of the magnetic bearing.

Figure 2:
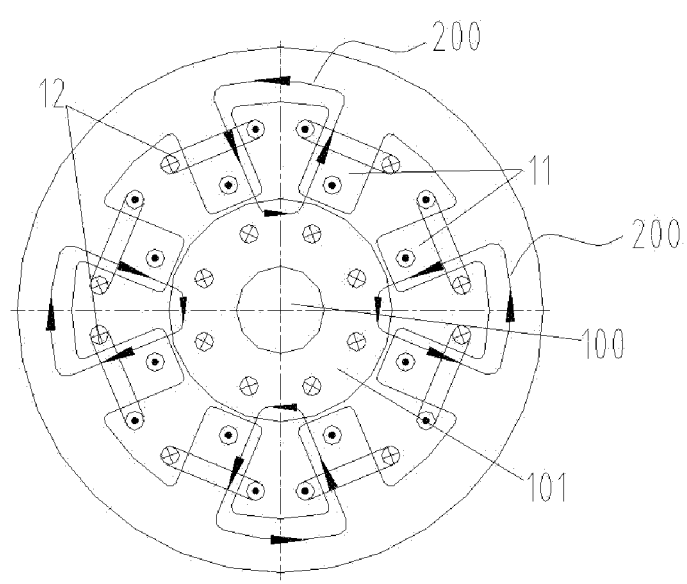
FIG. 2 is illustration of radial electromagnetic control magnetic circuits formed by a radial stator and radial control coils in FIG. 1.

As shown in FIG. 2, the plurality of stator teeth 11 are uniformly spaced circumferentially of the radial stator 1, and the number of the stator teeth 11 is 2N, where N≥2, and current directions in the radial control coils 12 on every adjacent two stator teeth 11 are just opposite to form a closed loop of the radial electromagnetic control magnetic circuit 200 between the adjacent two stator teeth 11 and a rotor 101.

As a specific structural form of the axial stator 2, in an embodiment, the axial stator 2 is provided with a first annular groove 21 on a side facing the stator teeth 11. An axial control coil 22 is arranged in the first annular groove 21. That is, the axial control coil 22 is arranged circumferentially of a rotating shaft 100, which may also be construed as being wound circumferentially of the rotor 101, thereby simplifying the winding process of the coil.

In an embodiment, the axial stator is 2 is further provided with a second annular groove 23 on the side facing the stator teeth 11. A permanent magnet 24 is arranged in the second annular groove 23. The permanent magnet 24 is provided for the purpose of providing a bias magnetic field, i.e., providing a magnetic field that keeps the rotor 101 statically centered. This magnetic field is an axial permanent magnet control magnetic circuit 302. On the basis of this magnetic field, when the strength of the axial electromagnetic control magnetic circuit 301 (the strength of a current in the axial control coil 22) is changed, the position of the rotor 101 can be adjusted by the axial control coils 22 in the two axial stators 2.

Figure 3:
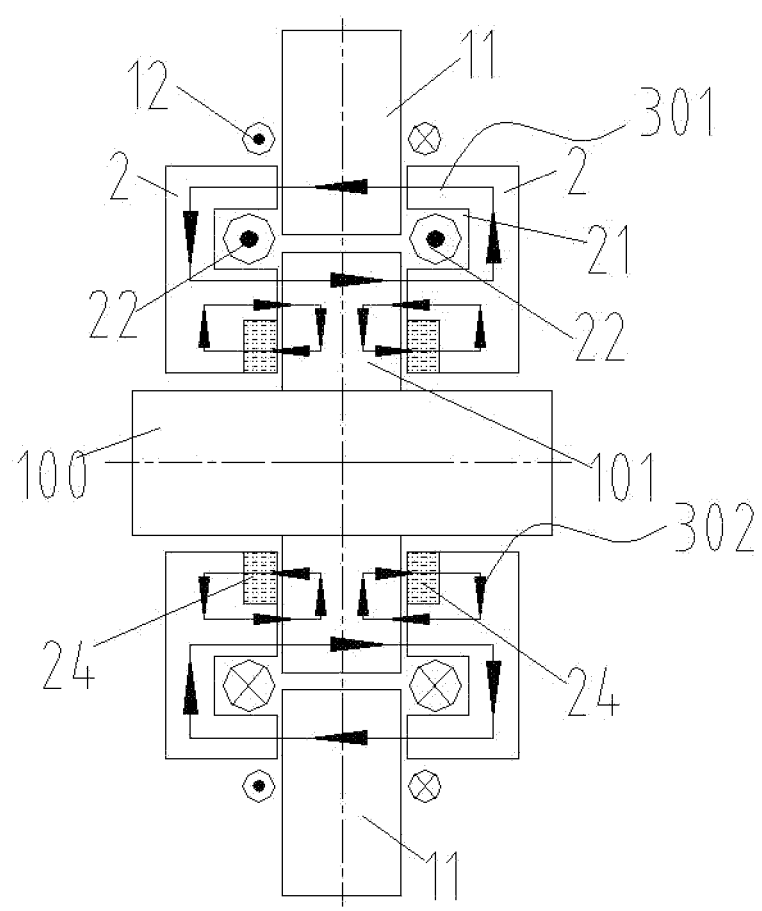
FIG. 3 is illustration of an axial electromagnetic control magnetic circuit and an axial permanent magnet control magnetic circuit formed by axial stators and axial control coils and permanent magnets in FIG. 1.
Figure 4:
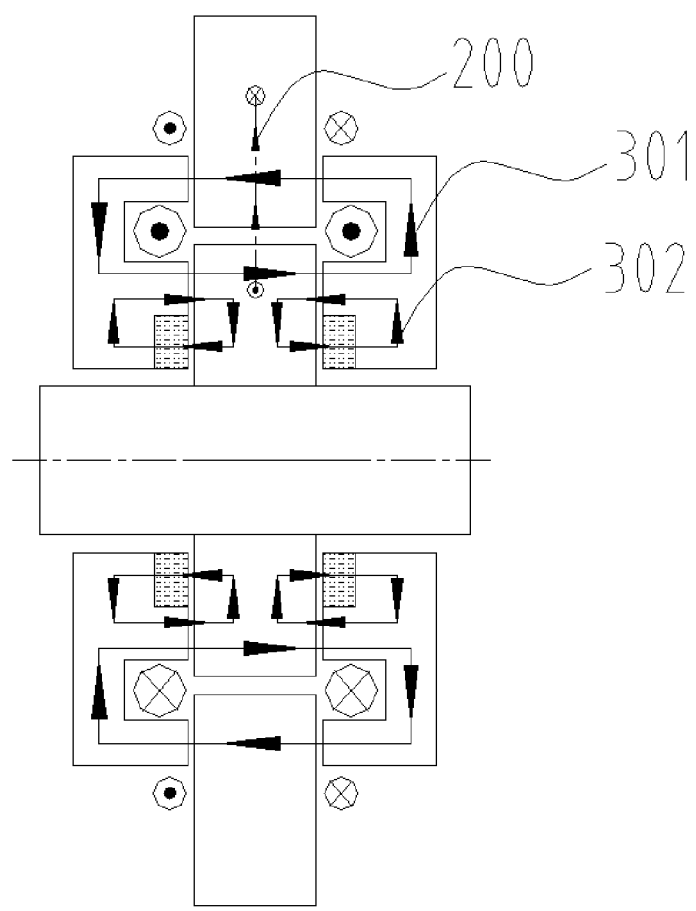
FIG. 4 is illustration of magnetic circuits in FIG. 3 in combination with the radial electromagnetic control magnetic circuits.

As shown in FIGS. 3 and 4, current directions of the axial control coils 22 on the two axial sides of the stator teeth 11 are same. In an embodiment, the first annular groove 21 has a first groove wall close to an axis of the axial stator 2, the first groove wall having a diameter D. When the magnetic bearing is assembled with the rotating shaft 100, the rotor 101 of the rotating shaft 100 has an outer diameter d, where d≥D, so that the axial electromagnetic control magnetic circuit 301 can pass through the axial stator 2 on one side to the rotor 101, then to the axial stator 2 on the other side, and then through the radial stator 1 and back to the axial stator 2 on the one side, to form a magnetic circuit closed loop. At this point, it can be understood that although both the axial electromagnetic control circuit 301 and the radial electromagnetic control circuit 200 spatially pass through the radial stator 1, the degree of magnetic circuit coupling is extremely low because the two magnetic circuits are actually crossed in a three-dimensional space; furthermore, the axial electromagnetic control circuit 301 in this case does not pass through an air gap between the radial stator 1 and the rotor 101 and thus is not coupled with the radial electromagnetic control circuit 200 at the air gap.

In an embodiment, the second annular groove 23 has an outer diameter H, where H<D. In an embodiment, the permanent magnet 24 is a plurality of permanent magnets 24 of tile-shaped structures arranged within the second annular groove 23. In an embodiment, the permanent magnet 24 is an annular permanent magnet, and/or the permanent magnet 24 is in interference fit with the second annular groove 23.

According to a specific embodiment of the present disclosure, a compressor is also provided, which includes the above-mentioned magnetic bearing.

According to a specific embodiment of the present disclosure, an air conditioner is also provided, which includes the above-mentioned compressor.

It is readily understood by those skilled in the art that the advantageous implementations described above can be freely combined and superimposed without conflict. Described above are only preferred embodiments of the present disclosure, which are not intended to limit the present disclosure, and all modifications, equivalent substitutions and improvements made within the spirit and principle of the present disclosure should be encompassed within the protection scope of the present disclosure. Described above are only preferred implementations of the present disclosure, and it should be noted that to those of ordinary skill in the art, a number of improvements and modifications may also be made without departing from technique principles of the present disclosure, and these improvements and modifications should also be deeded to be within the protection scope of the present disclosure.

The invention claimed is:

1. A magnetic bearing, comprising:
   a radial stator having a plurality of stator teeth extending inwardly in a radial direction of the radial stator;
   two axial stators arranged on two axial sides of the stator teeth, respectively; and
   radial control coils wound on the stator teeth, each of the radial control coils being located outside an area of the stator teeth covered oppositely by the two axial stators;
   wherein each axial stator is configured with a first annular groove on a side facing the stator teeth, and the magnetic bearing further comprises axial control coils arranged in the first annular grooves;
   wherein the first annular grooves have a first groove circumferential wall close to an axis of the axial stator and a second groove circumferential wall far away the axis of the axial stator, the first groove circumferential wall having a diameter D1 and the second groove circumferential wall having a diameter D2, and the magnetic bearing is provided to be assembled with a rotating shaft with a rotor having an outer diameter d, where D2>d>D1.

2. The magnetic bearing according to claim 1, wherein the plurality of stator teeth is uniformly spaced circumferentially of the radial stator, and the number of the stator teeth is 2N, where N≥2.

3. The magnetic bearing according to claim 1, wherein current directions of the axial control coils on the two axial sides of the stator teeth are the same.

4. The magnetic bearing according to claim 1, wherein each axial stator is further provided with a second annular groove on the side facing the stator teeth, and the magnetic bearing further comprises permanent magnets arranged in the second annular grooves.

5. The magnetic bearing according to claim 4, wherein the second annular grooves have an outer diameter H, where H<D.

6. The magnetic bearing according to claim 4, wherein the permanent magnets are annular permanent magnets.

7. The magnetic bearing according to claim 4, wherein the permanent magnets are in interference fit with the second annular grooves.

8. A compressor, comprising a magnetic bearing, the magnetic bearing comprising:
   a radial stator having a plurality of stator teeth extending inwardly in a radial direction of the radial stator;
   two axial stators arranged on two axial sides of the stator teeth, respectively; and
   radial control coils wound on the stator teeth, the radial control coils being located outside an area of the stator teeth covered oppositely by the two axial stators;
   wherein each axial stator is configured with a first annular groove on a side facing the stator teeth, and the magnetic bearing further comprises axial control coils arranged in the first annular grooves;
   wherein the first annular grooves have a first groove circumferential wall close to an axis of the axial stator and a second groove circumferential wall far away the axis of the axial stator, the first groove circumferential wall having a diameter D1 and the second groove circumferential wall having a diameter D2, and the magnetic bearing is provided to be assembled with a rotating shaft with a rotor having an outer diameter d, where D2>d>D1.

9. An air conditioner, comprising a compressor comprising a magnetic bearing, the magnetic bearing comprising:
   a radial stator having a plurality of stator teeth extending inwardly in a radial direction of the radial stator;
   two axial stators arranged on two axial sides of the stator teeth, respectively; and
   a radial control coil wound on the stator teeth, the radial control coil being located outside an area of the stator teeth covered oppositely by the two axial stators;
   wherein each axial stator is configured with a first annular groove on a side facing the stator teeth, and the magnetic bearing further comprises axial control coils arranged in the first annular grooves;
   wherein the first annular grooves have a first groove circumferential wall close to an axis of the axial stator and a second groove circumferential wall far away the axis of the axial stator, the first groove circumferential wall having a diameter D1 and the second groove circumferential wall having a diameter D2, and the magnetic bearing is provided to be assembled with a rotating shaft with a rotor having an outer diameter d, where D2>d>D1.

* * * * *